March 17, 1970  E. R. MARTIN ET AL  3,501,079
MULTIPLE SPINDLE FRICTION WELDER
Filed Feb. 5, 1968  5 Sheets-Sheet 1

INVENTORS
EUGENE R. MARTIN
CLAUDE F. WHITE
BY
Fryer, Tjensvold, Feix, Phillips & Lempio
ATTORNEYS

INVENTORS
EUGENE R. MARTIN
CLAUDE F. WHITE
ATTORNEYS

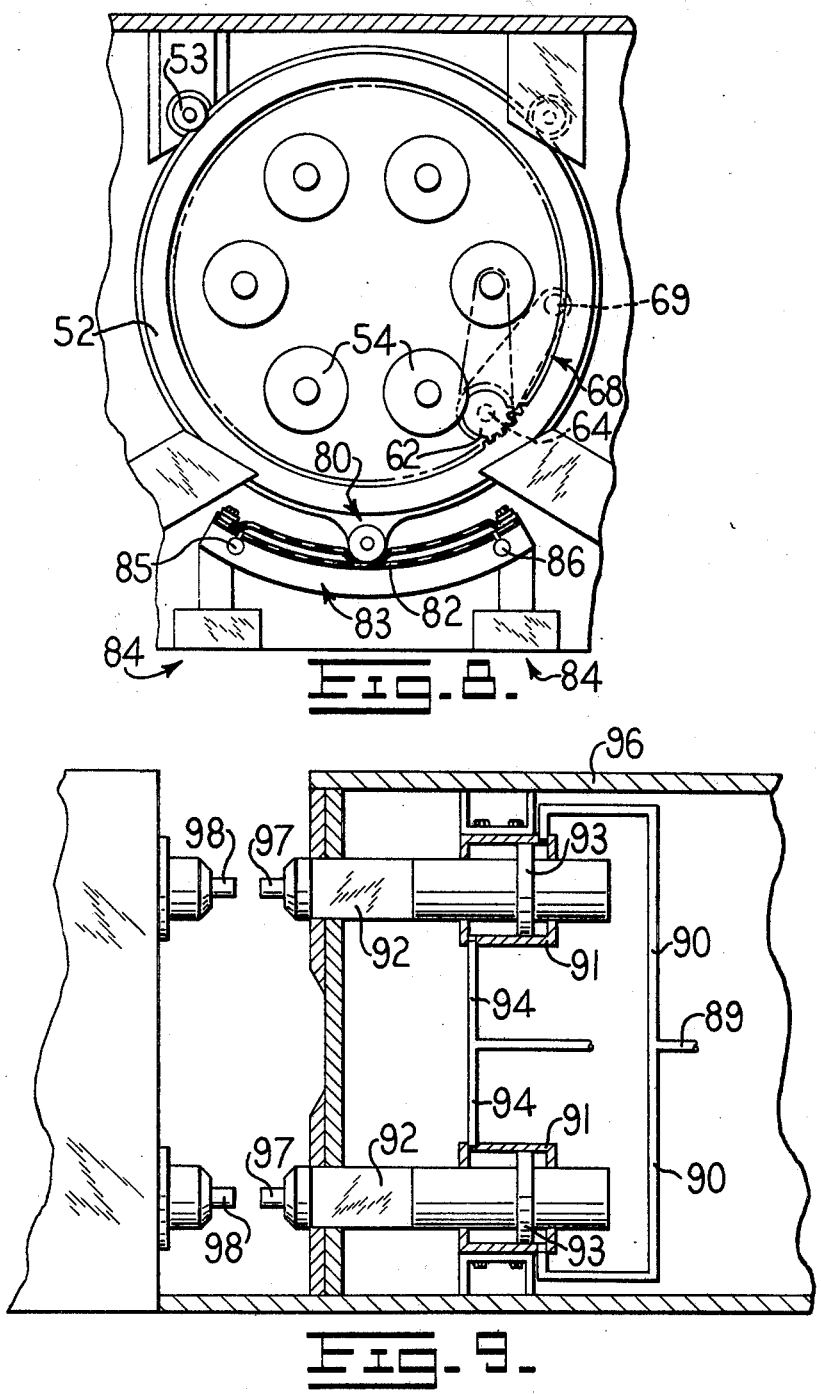

United States Patent Office 3,501,079
Patented Mar. 17, 1970

3,501,079
MULTIPLE SPINDLE FRICTION WELDER
Eugene R. Martin, East Peoria, and Claude F. White, Creve Coeur, Ill., assignors to Caterpillar Tractor Co., Peoria, Ill., a corporation of California
Filed Feb. 5, 1968, Ser. No. 703,173
Int. Cl. B23k 27/00
U.S. Cl. 228—2                                          16 Claims

ABSTRACT OF THE DISCLOSURE

A friction welder having a plurality of rotatable spindles coupled to a motor by a common primary drive and a plurality of secondary drives for simultaneous friction welding of a plurality of workpieces. Means are also disclosed for positioning the structures to be welded and for cyclically coupling two independent sets of spindles to the motor.

Background of the invention

This invention relates to improvements in friction welding apparatus of the general type wherein two workpieces are subjected to relative rotation while in contact with each other to generate frictional heat to raise the workpieces to a suitable welding temperature, whereupon the relative rotation subsides and the workpieces become bonded to each other.

It is also to be understood that the invention is specifically applicable to apparatus for performing the inertia welding process as described in United States Patent No. 3,273,233 and as set forth below. In the inertia welding process the energy required to bring the common interface of the parts to a bondable condition is stored as kinetic energy in rotating inertia weights. These weights generally take the form of flywheels and are connected to one of the parts and the entire energy necessary to form the bond is stored in the weights prior to engagement of the parts at the interface. The stored energy is discharged into the interface through frictional heating and plastic working developed at the interface as the rubbing contact slows the rotating weights and the bonding cycle is concluded.

Fluctuant production requires welding machinery which is capable of efficiently handling a wide range of production rates. This is especially true in such highly competitive fields as the automotive industry. Obviously, there is a functional rate limit on any welder which can weld but two workpieces together at any one time. Its adaptability to increased production rates is limited to its maximum cyclic speed. Friction welders, which require a build-up of momentum for each cycle, are particularly handicapped by such cyclic limitation.

Accordingly, it is a primary object of the present invention to provide friction welder capable of meeting the demands for high production rates.

Another object of the invention is to provide a friction welder capable of welding small diameter workpieces without applying excessive inertial energy or axial load, Yet another object of the present invention is to produce a friction welder capable of welding small diameter workpieces at economical rates.

Summary of the invention

Briefly described, the present invention is directed toward a friction welder comprising a motor, a plurality of spindles mounted for rotation, a plurality of chucks connected to the spindles, and means coupling the motor to the spindles. The coupling means has a primary drive common to each spindle and a plurality of secondary drives which couple the primary drive with the spindles. With this machine, a plurality of workpieces may be simultaneously held by the chucks and rotated for friction welding to other workpieces. The friction welder may also be provided with means for positioning the workpieces to be welded and means for alternately cycling two sets of spindles.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

Brief description of the drawings

FIG. 8 is a front elevation of yet another positioning means in a friction welder; and FIG. 9 is a side elevation, partially in section, of an alternate configuration of a tailstock member of a friction welder.

Description of the preferred embodiments

Figure 1:
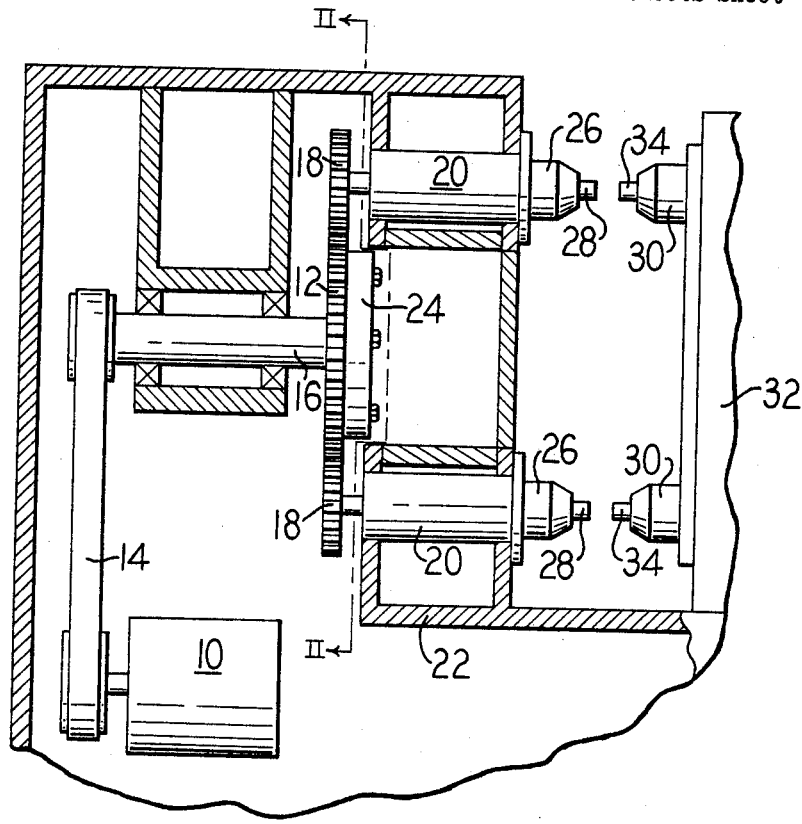
FIG. 1 is a side elevation of one embodiment of the present invention with supporting member and frame shown in cross-section.
Figure 2:
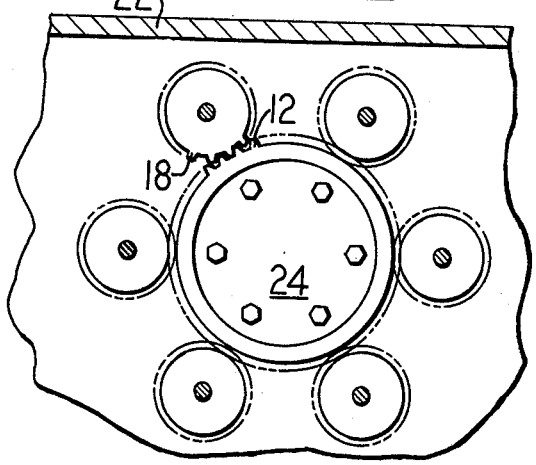
FIG. 2 is a frontal view in elevation of the embodiment of FIG. 1 taken on the line II—II of FIG. 1.

Referring now in more detail to the drawings, there is illustrated in FIGS. 1 and 2 one embodiment of a friction welder constructed in accordance with the present invention. A motor 10 is coupled to a main drive gear 12 by means of a belt 14 and a shaft 16. A disconnect mechanism could also be incorporated in the drive between the power unit 10 and gear 12 if necessary or desired. In mesh with the main drive gear are a number of spindle gears 18 which are axially connected to a number of parallel, rotatable spindles 20 mounted on a frame 22. For clarity, only two spindles are illustrated in FIG. 1.

Fastened to main drive gear 12 is a flywheel 24 which serves as the principal inertia mass for all of the spindles. Attached to each end of the rotatable spindles are chucks 26 which are illustrated holding workpieces 28 which are to be welded. For each of the rotatable chucks 26 there is a corresponding non-rotatable chuck 30 mounted on a tailstock assembly 32. The tailstock is mounted in frame 22 for parallel movement along the parallel axes of spindles 20. Held in non-rotatable chucks 30 are other workpieces 34 which are to be respectively welded to workpieces 28.

A typical welding sequence consists of first clamping workpieces 28 and 34 into chucks 26 and 30, respectively. Tailstock assembly 32 is next moved into the position shown, thereby placing workpieces 28 and 34 in close proximity with each other. Motor 10 is then actuated to rotate main drive gear 12 which accelerates flywheel 24 to a predetermined velocity. Spindle gears 18, in mesh with the rotating main drive gear, cause spindles 20 and workpieces 28 to accelerate until a predetermined velocity is obtained. At this point, motor 10 is disengaged from the drive train or shut down.

Tailstock 32 is then advanced toward the spindles 20 until the fixed workpieces 34 contact the rotating workpieces 28 under a predetermined axial load. The energy stored in the rotating components, including flywheel 24, is converted to heat at the interfaces of workpieces 28 and 34 as a result of the relative motion (friction) and the applied axial pressure. Heating of the workpieces continues as the stored energy is released until their forging temperature is reached. At this point, the ends of workpieces 28 and 34 upset and weld together and relative rotation ceases.

By determining the amount of kinetic energy stored in the rotating members and flywheel, a plurality of welds can be performed with a predetermined amount of upset and the welds will be completed as the rotating members come to rest. At the completion of the weld cycle the applied axial force is released, chucks 26 loosened, and tailstock assembly 32 returned to its pre-weld position. Chucks 34 are then loosened and the welded workpieces are removed. The operation may now be repeated.

The described friction welder is capable of meeting demands for high production rates inasmuch as several workpieces may be welded simultaneously to several other workpieces. Fluctuations in production rates are also more easily managed. That but one inertia mass is used permits small diametered workpieces to be welded together without substantial risk of excessive inertia energy being released at the interfaces. Similarly, the axial pressure is distributed over several workpieces. These factors are very important when welding small diameter workpieces and have heretofore presented quite serious problems when using single spindle prior art welders. The use of a single motor adds to the economic value of the welder.

Figure 3:
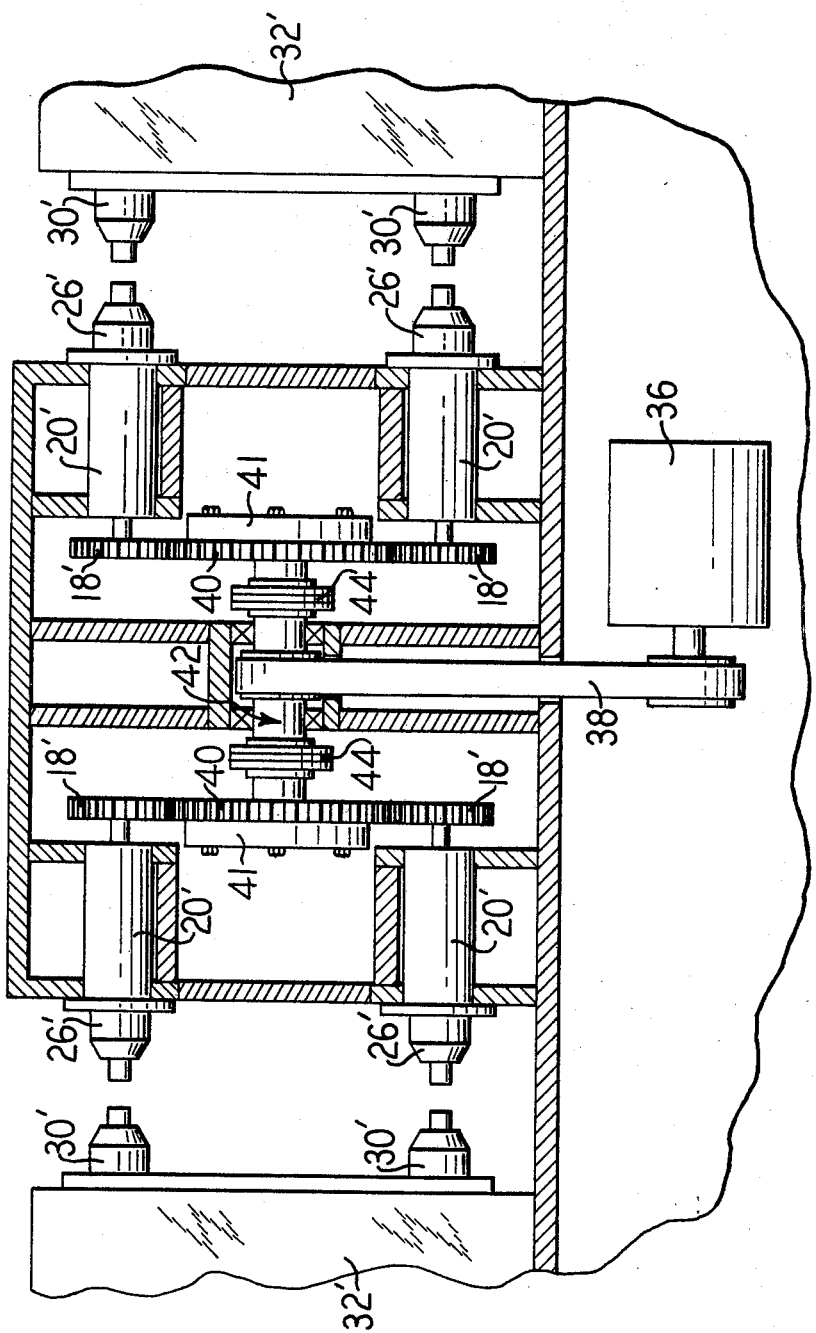
FIG. 3 is a side elevation of another embodiment of the invention with supporting members and frame shown in cross-section.

Referring now to FIG. 3, there is illustrated a double headed multiple spindle friction welder powered by a commen motor 36 and belt 38. In this embodiment, two main drive gears 40 and inertia masses 41 are affixed to opposite ends of shaft 42. A set of spindle gears 18', spindles 20' and chucks 26' are connected to each main drive gear as was the single set in the single header embodiment of FIG. 1. Two tailstocks 32' having non-rotatable chucks 30' are positioned adjacent each set of rotatable chucks 26', respectively.

Shaft 42 is provided with two disconnects 44 located on opposite sides of belt 38. In this manner, each set of spindles may be coupled to motor 36 independently of the other. Clutch means could alternatively be used at 44 to achieve this interdependence. Such a double headed multiple spindle welder could more than double the output of a single headed multiple spindle welder. This increased production rate results not only from the increased number of spindles but is also due to the clutches or disconnect mechanisms 44 between the power source and drive gears 40. By properly utilizing the disconnect mechanisms, continuous cycling is possible whereby one set of spindles can be accelerating and welding while the other set is being loaded or unloaded and vice versa.

Figure 4:
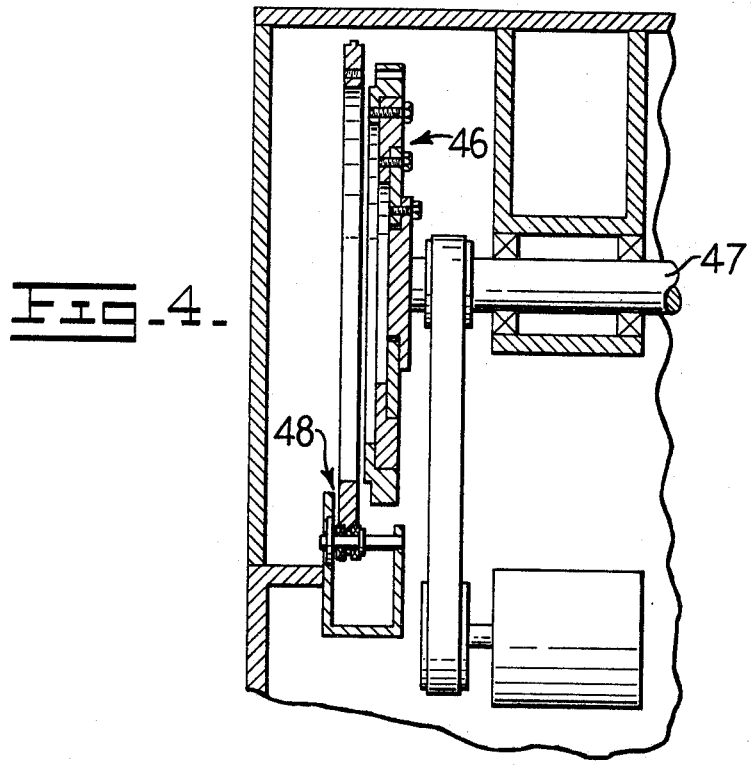
FIG. 4 is a fragmentary, cross-sectional view illustrating an alternate configuration of an inertia mass element of a welder constructed in accordance with the present invention.

FIG. 4 illustrates an alternative inertia mass configuration consisting of a plurality of flywheels 46 which may be selectively attached to the end of a shaft 47 opposite the end to which the main drive gear is affixed. As welding conditions dictate, one or more of the flywheels 46 may be stored on a storage ring assembly as generally shown by reference numeral 48 where they are readily accessible should additional weight be required.

Figure 5:
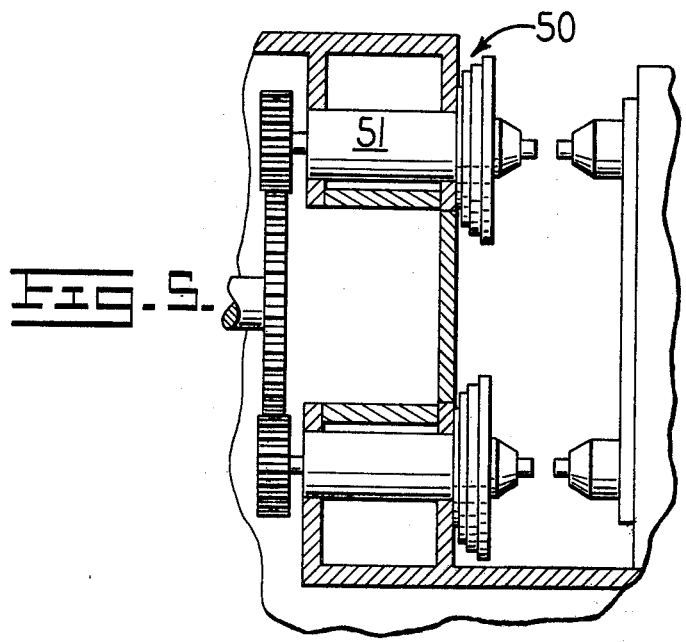
FIG. 5 is a fragmentary side elevation partially in section of yet another configuration of an inertia mass element.

FIG. 5 illustrates yet another arrangement wherein a number of flywheel weights 50 may be selectively attached to the individual spindles 51.

Figure 6:
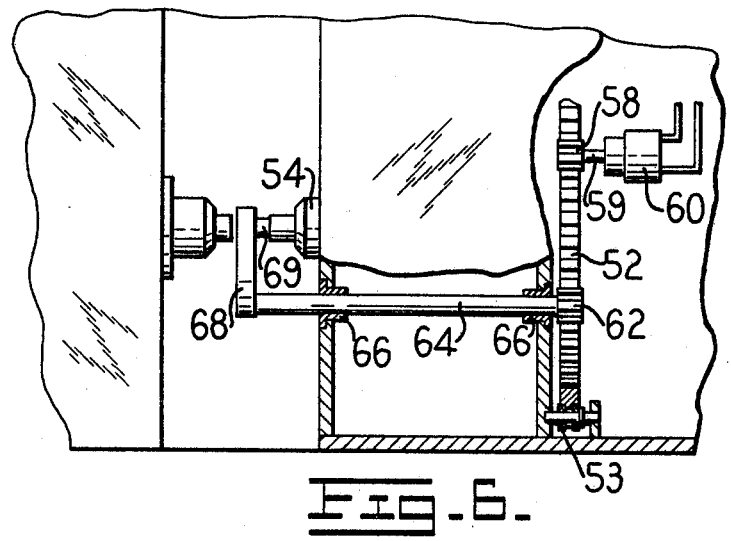
FIG. 6 is a fragmentary side elevation illustrating means for positioning structures to be welded in a friction welder.

FIG. 6 depicts a length-compensating stop mechanism which may be incorporated in the disclosed friction welders. A relatively large diameter ring gear 52 is situated behind non-rotatable chucks 54 attached to tailstock 56. The ring gear 52 is supported for rotation by several shaft and bearing assemblies 53. A drive pinion 58 engages the ring gear 52 and is powered by a shaft 59 from a fluid motor 60. Also engaged with the ring gear are several driven pinions one of which is shown at 62. A shaft 64, supported by bushings 66, extends from driven pinion 62 to the exterior of tailstock 56. A stop arm 68 is fastened to the end of shaft 64; a stop pin 69 is in turn attached to the end of the stop arm.

An operative sequence of the length compensating stop mechanism consists of first activating fluid motor 60. This causes drive pinion 58 to turn ring gear 52 which turns driven pinions 62, shafts 64, stop arms 68 and stop pins 69. The fluid motor is activated only long enough to cause shafts 64 to turn a short distance so as to position stop pins 69 in front of each non-rotatable chuck 54. Suitable switches or stops, not shown, may be provided to insure precise positioning of the stop arms.

The workpieces to be welded are next fed into chucks 54 from the rear of tailstock 56 until they make contact with stop pins 69. The feed mechanisms are then deactivated and the holding mechanism of each chuck 54 activated. The workpieces to be welded are thus securely held by chucks 54 at positions in which each workpiece extends from the chucks equidistantly. Fluid motor 60 is now operated in reverse causing stop arms 68 and stop pins 69 to pivot from in front of chucks 54. After the stop pins 69 have been pivoted away from the chucks, the welding operation may begin.

Figure 7:
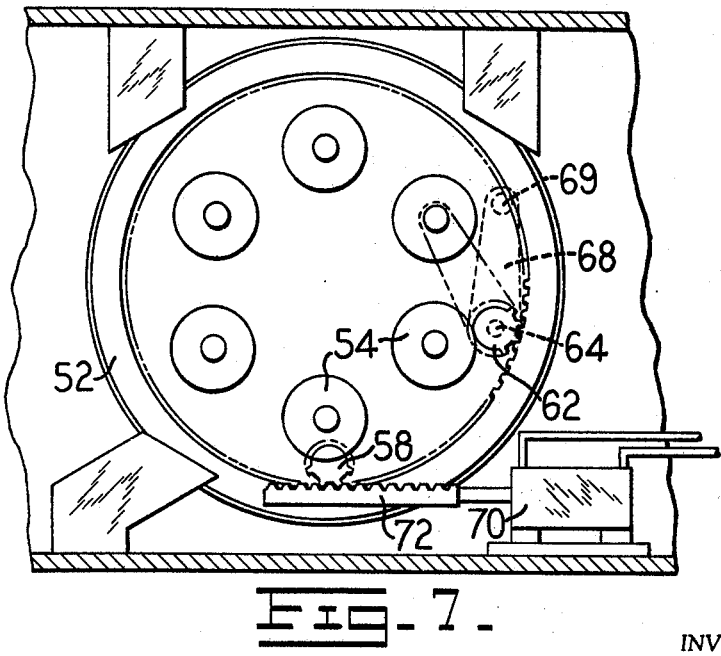
FIG. 7 is a fragmentary, rear elevation illustrating alternate means for positioning structures to be welded.

FIG. 7 is a rear view illustrating modified means for rotating the ring gear 52 in a length compensating stop mechanism of the type described in FIG. 6. A suitable motor such as a double acting hydraulic ram 70 having a rod end provided with a rack 72 is used in place of the motor 60 of FIG. 6. The pinion 58 meshes with both rack 72 and the ring gear 52. Operation of driven pinions 62, shafts 64, stop arms 68 and stop pins 69 is essentially the same as described above.

FIG. 8 is a rear view of an embodiment similar to FIG. 6 and illustrating modified means for rotating a ring gear in a length compensating stop mechanism. A roller assembly 80 is attached to ring gear 52 and rests against an elongated flexible tube 82. The tube is fastened to a backup plate 83 which in turn is supported by plate assemblies 84. As pressurized fluid is fed into tube inlet 85, tube 82 fills forcing roller assembly 80 to move to the right thereby rotating ring gear 52 counterclockwise. The ring gear operates driven pinions 62, shafts 64, stop arms 68 and stop pins 69 as hereinbefore described. The operation is reversed by feeding the pressurized fluid into outlet 86 forcing roller assembly 80 back to the left.

FIG. 9 illustrates yet another embodiment for avoiding unequal contact pressure of the several parts being welded due to unequal part lengths. In FIG. 9 a common conduit 89 branches into a plurality of conduits 90 which communicate with the head ends of cylinders 91 for reciprocally operating non-rotatable chucks 92. Common conduit 89 communicates with a source of fluid pressure which is not shown in the drawings. Piston members 93 are fixed to the chucks 92 within cylinders 91. Return lines 94 permit fluid communication between the fluid pressure source and the rod ends of cylinders 91.

In this embodiment the tailstock 96 does not move as an integral unit. Instead, chucks 92 are caused to move individually to the left to bring workpieces 97 into contact with rapidly rotating workpieces 98. Since chucks 92 are axially driven by pressure fluid emanating through common conduit 89, each chuck is subjected to equal pressure. Thus, with this device, equal contact pressure is achieved at each spindle despite the fact that the distances separating confronting pairs of workpieces 97, 98 may vary from one spindle to the next.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A friction welder comprising a main frame structure, a motor, a plurality of spindles mounted for rotation within said frame structure, a plurality of rotatable chucks connected to said spindles, and means coupling the motor to said plurality of spindles, said coupling means having a primary drive common to each spindle and a plurality of secondary drives coupling said primary drive to each of said plurality of spindles whereby a plurality of first workpieces may be simultaneously held by said rotatable chucks and rotated for friction welding to a plurality of second workpieces.

2. The friction welder of claim 1 wherein said primary drive comprises a shaft operably connected to said motor and a main drive gear affixed to said shaft.

3. The friction welder of claim 2 wherein each of said secondary drives comprises a spindle gear affixed to an end of one of said spindles and wherein each of said spindle gears are in mesh with said main drive gear.

4. The friction welder of claim 1 having an inertia mass affixed to said primary drive.

5. The friction welder of claim 2 having an inertia mass affixed to said main drive gear.

6. The friction welder of claim 1 having an inertia mass affixed to each of said plurality of spindles.

7. The friction welder of claim 1 wherein each of said spindles are disposed parallel to each other and wherein said welder further comprises a tailstock having a plurality of non-rotatable chucks axially aligned with said rotatable chucks.

8. The friction welder of claim 7 wherein said tailstock is mounted for movement along the axes of said parallel spindles whereby said second workpieces may be held in said non-rotatable chucks and brought into contact with said first workpieces and friction welded thereto.

9. The friction welder of claim 8 having means for positioning said second workpieces along the axes of said spindles whereby each of said first workpieces contact each of said second workpieces simultaneously when said tailstock is moved along said axes.

10. The friction welder of claim 9 wherein said positioning means comprises a motor, a plurality of stops and means coupling said motor and said stops for rotation of the stops into and out of a position of alignment with each of said axes.

11. The friction welder of claim 10 wherein each of said stops are mounted for rotation in a common plane whereby the ends of said second workpieces are positioned in a common plane.

12. The friction welder of claim 10 wherein said positioning means comprises a motor operated rotatable ring gear, a plurality of pinions in mesh with said ring gear, and a plurality of shafts respectively linking said pinions with said stops.

13. The friction welder of claim 9 wherein said positioning means comprises a source of pressurized fluid, an elongated inflatable tubular member in communication with said source for inflation and deflation from each end thereof, a roller mounted for movement responsive to inflation of said tubular member, a ring gear attached to said roller and rotatable upon movement of said roller, a plurality of pinions in mesh with said ring gear, and a plurality of stops connected to said pinions for rotation into and out of alignment with each of said axes.

14. The friction welder of claim 10 wherein said positioning means comprises a motor driven rack, a first pinion in mesh with said rack and said ring gear, a plurality of second pinions in mesh with said ring gear, and a plurality of shafts respectively linking said second pinions with said stops.

15. The friction welder of claim 7 wherein said plurality of non-rotatable chucks are mounted in said tailstock for individual movement along their respective axes of alignment and wherein said plurality of non-rotatable chucks are coupled to a common source for applying axial pressure to said non-rotatable chucks.

16. The friction welder of claim 1 wherein said plurality of spindles comprises two sets of spindles and wherein said coupling means comprises means for selectively disconnecting each of said sets of spindles from the motor whereby a plurality of workpieces may be positioned in or removed from the rotatable chucks connected to said one set of spindles while workpieces in the rotatable chucks connected to the other set of spindles are being welded and vice versa.

References Cited

UNITED STATES PATENTS

| | | | |
|---|---|---|---|
| 3,234,647 | 2/1966 | Hellander et al. | 29—470.3 |
| 3,337,108 | 8/1967 | Taylor | 228—2 |
| 3,388,849 | 6/1968 | Blum et al. | 228—2 |
| 3,450,325 | 6/1969 | Funk et al. | 228—2 |

CHARLIE MOON, Primary Examiner

R. B. LAZARUS, Assistant Examiner

U.S. Cl. X.R.

29—470.3